US009704221B2

(12) United States Patent
Hori et al.

(10) Patent No.: US 9,704,221 B2
(45) Date of Patent: Jul. 11, 2017

(54) IMAGE PROCESSING APPARATUS AND IMAGE PROCESSING METHOD

(71) Applicant: CANON KABUSHIKI KAISHA, Tokyo (JP)

(72) Inventors: Shinjiro Hori, Yokohama (JP); Kouta Murasawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/708,409

(22) Filed: May 11, 2015

(65) Prior Publication Data
US 2015/0243000 A1   Aug. 27, 2015

Related U.S. Application Data

(63) Continuation of application No. 14/084,753, filed on Nov. 20, 2013, now Pat. No. 9,052,742, which is a
(Continued)

(30) Foreign Application Priority Data

May 24, 2010   (JP) ................. 2010-118770

(51) Int. Cl.
*G06T 5/00* (2006.01)
*G11B 27/034* (2006.01)
(Continued)

(52) U.S. Cl.
CPC ............... *G06T 5/00* (2013.01); *G06F 3/01* (2013.01); *G06T 5/40* (2013.01); *G11B 27/034* (2013.01); *H04N 9/73* (2013.01); *G11B 27/34* (2013.01)

(58) Field of Classification Search
None
See application file for complete search history.

(56) References Cited

U.S. PATENT DOCUMENTS 6,674,924 B2   1/2004   Wright et al.
6,952,503 B2   10/2005   Matsuura
(Continued)

FOREIGN PATENT DOCUMENTS

JP   2005-006213 A   1/2005
JP   2005-208884 A   8/2005
(Continued)

OTHER PUBLICATIONS

Japanese Office Action dated Jan. 31, 2014, issued in corresponding Japanese Patent Application No. 2010-118770.
(Continued)

*Primary Examiner* — Delomia L Gilliard
(74) *Attorney, Agent, or Firm* — Fitzpatrick, Cella, Harper & Scinto

(57) ABSTRACT

An image processing apparatus includes an input unit to input image data. A first correction unit performs a first type of correction for the input image data, based on a result of analysis of the image data. A storage unit stores the corrected image data. A second correction unit performs a first type of manual correction for the stored image data using a correction parameter in accordance with a user instruction. A third correction unit performs a second type of correction for the input image data, based on a result of analysis of the image data in a case when a second type of correction instruction based on an image analysis is input, after the first type of manual correction is performed by the second correction unit. The second type of correction is different from the first type of correction.

10 Claims, 12 Drawing Sheets

Related U.S. Application Data continuation of application No. 12/964,307, filed on Dec. 9, 2010, now Pat. No. 8,620,105.

(51) Int. Cl.
*G06F 3/01* (2006.01)
*G06T 5/40* (2006.01)
*H04N 9/73* (2006.01)
*G11B 27/34* (2006.01)

(56) References Cited

U.S. PATENT DOCUMENTS

| | | | |
|---|---|---|---|
| 7,433,079 B2 | 10/2008 | Kotani | |
| 7,881,554 B2 | 2/2011 | Castorina et al. | |
| 7,953,250 B2 | 5/2011 | Steinberg et al. | |
| 8,427,674 B2 | 4/2013 | Sato | |
| 8,817,326 B2 | 8/2014 | Murasawa | |
| 2003/0016881 A1* | 1/2003 | Matsuura | G06T 5/009 382/274 |
| 2004/0263887 A1* | 12/2004 | Kotani | H04N 1/56 358/1.9 |
| 2005/0200921 A1* | 9/2005 | Yuan | G06T 5/009 358/518 |
| 2007/0279500 A1* | 12/2007 | Castorina | G06T 5/008 348/254 |
| 2008/0317376 A1* | 12/2008 | Kasperkiewicz | G06T 5/00 382/274 |
| 2009/0174879 A1 | 7/2009 | Sato | |
| 2009/0174897 A1 | 7/2009 | Sato | |
| 2009/0304278 A1 | 12/2009 | Steinberg et al. | |
| 2011/0090366 A1 | 4/2011 | Yoon et al. | |
| 2011/0289504 A1 | 11/2011 | Murasawa | |

FOREIGN PATENT DOCUMENTS

| | | |
|---|---|---|
| JP | 2005-260496 A | 9/2005 |
| JP | 2008-016995 A | 1/2008 |
| JP | 2008-228140 A | 9/2008 |
| JP | 2009-159065 A | 7/2009 |
| JP | 2009-164972 A | 7/2009 |

OTHER PUBLICATIONS

Inoue, Akira, and Johji Tajima, "Adaptive Quality Improvement Method for Color Images," Proc. SPIE, Human Vision, Visual Processing, and Digital Display, May 1, 1994, vol. 2179, pp. 429-439.

ASCII Corporation, Easy Photo Retouching Starting with Adobe Photoshop Elements 4.0, Mac People, Japan, Jan. 1, 2007, vol. 13, No. 1, pp. 115-119.

* cited by examiner

IMAGE PROCESSING APPARATUS AND IMAGE PROCESSING METHOD

CLAIM OF PRIORITY

This application is a continuation of co-pending U.S. patent application Ser. No. 14/084,753, filed Nov. 20, 2013, and published as U.S. Patent Application Publication No. 2014/0078051, which is a continuation application of U.S. patent application Ser. No. 12/964,307, filed Dec. 9, 2010, now U.S. Pat. No. 8,620,105.

This application also claims the benefit of Japanese Patent Application No. 2010-118770, filed May 24, 2010, which is hereby incorporated by reference herein in its entirety.

BACKGROUND OF THE INVENTION

1. Field of the Invention

The present invention relates to an image processing apparatus and an image processing method. More particularly, the present invention relates to an image processing apparatus and an image processing method capable of a quick response by omitting an unnecessary process, while maintaining the order of image processes, even when the image processes include one requiring a quick response.

2. Description of the Related Art

In recent years, image data are frequently manipulated with photo retouching applications that perform image modification, correction, and the like. For example, a photo retouching application may correct, adjust, and print captured image data, or upload captured image data to a web site, in order to share it and/or make it open to the public.

Functions provided by the photo retouching application are basic correction and adjustment functions to improve poor quality of captured image data, for example, to adjust the angle of view, brightness, and tint. In addition to these functions, the photo retouching application even provides a function of analyzing image data and automatically correcting it. FIG. 12 is a view showing the state transition of a general photo retouching application.

FIG. 12 shows a data sequence when the user selects an image to be corrected and inputs an instruction to correct the image data. In FIG. 12, particularly, an exceptional process, such as an error process is omitted. In correction instruction wait state S1201, an image is selected. In this state, the user has selected one image using an image selection UI (not shown), and is to select a correction process. When the user selects a correction process, the photo retouching application selects and executes an image process in accordance with his selection. In FIG. 12, four image processes are prepared, for descriptive convenience. Image processes 1 to 4 are different from each other, and are, for example, automatic correction, automatic red-eye correction, sharpness correction, and brightness/contrast adjustment. Automatic correction provides a correction result suited to an image by analyzing an image without performing fine correction control by the user, such as correction of the brightness, color balance, and local brightness of image data.

For example, when image process 2 is red-eye correction, the photo retouching application changes from correction instruction wait state S1201 to image process 2 state S1203 to detect a red-eye area in image data and automatically perform red-eye correction. Alternatively, the photo retouching application prompts the user to designate a red-eye area, and corrects the designated red-eye area, providing the red-eye correction result to the user. After the end of the red-eye correction, the photo retouching application changes from image process 2 state S1203 to output state S1206 to output image data obtained in the image process 2 state. The image data is output by, for example, displaying the corrected image data on a display, printing it by a printer, or writing it on a recoding medium, such as a CF card or an HDD. After the end of the output, the photo retouching application changes from output state S1206 to correction instruction wait state S1201. At this time, the user can confirm the correction result on the display and input a new correction instruction. If the user is satisfied with the correction result, he can shift to selection of the next image, or input an instruction, for example, to end the photo retouching application.

FIG. 12 shows the state transition of a general photo retouching application. An application of this type has many independent functions, so image processes are often separately executed. Thus, this application assumes a user who is rather skilled in image correction.

However, the development of the image analysis technique and the use of the accompanying image correction technique can easily provide an effect that has not been obtained unless a plurality of correction effects are combined. As an example of the image analysis technique, a detection technique for an object, particularly a person's face in image data has been improved, and even a general PC can obtain a high-precision detection result. Further, even a photographing scene can be estimated from image data.

Many manufacturers have proposed automatic correction techniques capable of automatically obtaining optimum image correction effects for respective images using various image analysis results. Some of these automatic correction techniques can attain a very complicated correction result by combining correction for the entire image and locally controlled correction. An image correction application that provides a combination of automatic correction processes needs to control the order of image processes, instead of executing many image processes in random order by the user.

For example, the image correction application imposes restrictions, such that automatic correction is always executed first, other correction processes are performed for an automatically corrected image, and double execution of automatic correction is inhibited. FIG. 13 is a view showing the state transition of image correction in the image correction application. In FIG. 13, particularly, an exceptional process, such as an error process, is omitted. In FIG. 13, image processes 1 to 4 are executed sequentially in the order named, unlike the photo retouching application shown in FIG. 12. In correction instruction wait state S1301, an image is selected. In this state, the user has selected one image using an image selection UI (not shown), and is to select a correction process. When the user selects a correction process, image processes 1 to 4 are sequentially executed in accordance with his selection. These image processes use, as input data, image data of the image selected by the user. The photo retouching application performs processes using, as an input, image data having undergone each image process. To the contrary, the image correction application uses uncorrected original image data.

Hence, when the user selects image processes 1 and 3 first, the image correction application executes image process 1 in image process 1 state S1302 using original image data as input data. Since image process 2 is not selected, the image correction application skips image process 2 state S1303, and executes image process 3 for output data in the image process 1 state in image process 3 state S1304. The image correction application skips subsequent image process 4 state S1305, outputs the result of executing image processes 1 and 3 in output state S1306, and then returns to correction instruction wait state S1301.

If the user is not satisfied with the obtained correction result, he inputs a new correction instruction in correction instruction wait state S1301. Assume that the user designates all image processes 1 to 4. In this case, the image correction application cancels the previous correction result, sequentially executes image processes 1 to 4 for original image data, and outputs the result.

Some image processes designate a plurality of correction areas. An example of this process is a manual red-eye correction function of designating a correction area by the user and performing red-eye correction. Such a function holds user area designation information, and controls the image process to reflect the correction results of all designated areas every time area designation information is added.

Japanese Patent Laid-Open No. 2009-164972 provides a system in which an image process is described in advance, as a predetermined template pattern. The user can create a modified template based on the predetermined template. The system allows the user to freely control the process (for example, contents and parameters).

In the foregoing image processing application, the order of image processes is determined. When providing an image process sequence in which the order of image processes is determined, the process needs to be executed from the beginning, in the process sequence as shown in FIG. 13, every time the image process instruction changes. Since even designated correction is executed every time one correction instruction changes, no high-speed process can be implemented. Especially, a manual adjustment (1D-LUT process for color balance, brightness, and CMYD), and the like, are often provided to the user via a UI (User Interface), as shown in FIG. 14. In FIG. 14, a manual adjustment function is selected. Two functions, that is, manual adjustment 1 U1402 and manual adjustment 2 U1404 are provided as buttons, and the function is enabled by pressing the button. For descriptive convenience, manual adjustment 1 is color balance correction, and manual adjustment 2 is brightness correction. As a matter of course, UIs and functions are not limited to them. In color balance correction, the tint of image data is corrected. A slider bar U1403 is moved rightward to enhance the blueness of the entire image, and leftward to enhance the redness. In brightness correction, the brightness of image data is adjusted. A slider bar U1405 is moved rightward to correct the entire image to be bright, and leftward to correct it to be dark.

With the manual adjustment function, the user desirably confirms the correction effect and determines the correction amount, while visually checking a preview image (not shown). For the manual adjustment function, a quick response is important to reflect the process result at the same time as the UI operation. When correction functions are provided by classifying them into a plurality of categories as UIs, like correction 1 U1406 and correction 2 U1407, it is very important for user friendliness to reflect the correction effect as soon as possible. This also applies to a case in which the correction operation is performed by switching the UI.

Although the response speed of the correction process is important, it is difficult to increase the response speed in control of executing image processes in a predetermined order, as shown in FIG. 13. Japanese Patent Laid-Open No. 2009-164972 provides a system that allows the user to describe a process sequence. However, this reference does not describe a dynamic change of the process sequence to optimize internal processes and to increase the process speed.

SUMMARY OF THE INVENTION

The present invention has been made to overcome the conventional drawbacks, and to provide an image processing apparatus and program capable of implementing even automatic correction that can obtain a high-quality correction result, while increasing the response speed for an image process requiring a quick response.

The present invention comprises the following arrangement.

According to an aspect of the present invention, an image processing apparatus comprises a first processing unit that executes an image process of a predetermined first category for image data of interest, and saves the processed image data in a first intermediate buffer, a second processing unit that executes an image process of a predetermined second category for the image data saved in the first intermediate buffer, and saves the processed image data in a second intermediate buffer, and a display unit that displays, as an image, the image data having undergone the image processes by the first processing unit and the second processing unit.

The present invention can provide an image processing method of classifying image processes into a plurality of categories, holding an intermediate output for each category, and omitting an unnecessary process, to enable a quick response, while maintaining the order of image processes, even when the image processes include one requiring a quick response.

Further features of the present invention will become apparent from the following description of exemplary embodiments with reference to the attached drawings.

DESCRIPTION OF THE EMBODIMENTS

First Embodiment

Figure 1:
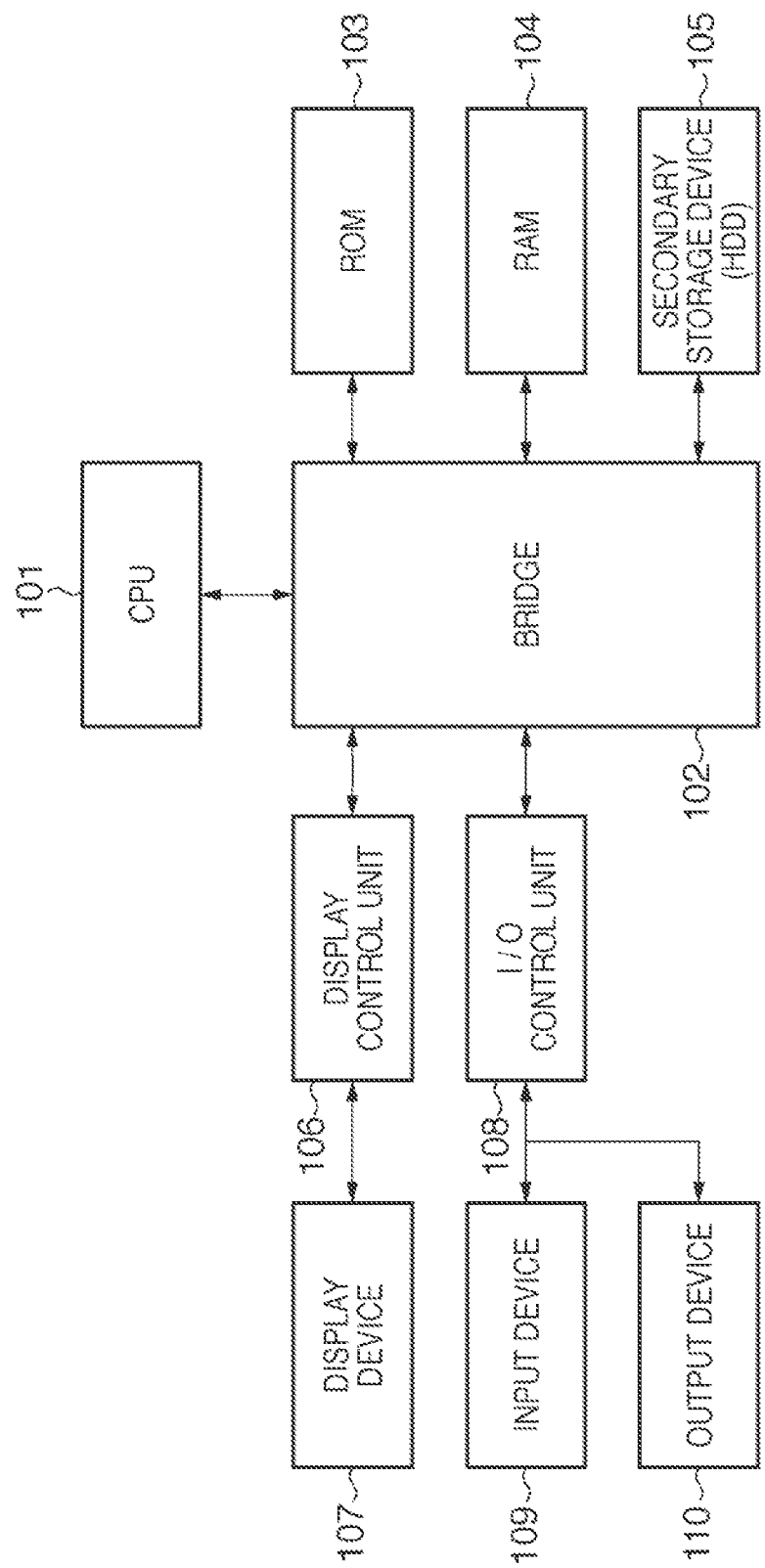
FIG. 1 is a block diagram in the first embodiment.

FIG. 1 is a block diagram of an image processing method according to the present invention. The image processing method assumes the use of a PC. A CPU (Central Processing Unit) 101 controls other functional blocks and devices. A bridge 102 provides a function of controlling exchange of data between the CPU 101 and other functional blocks. A ROM (Read Only Memory) 103 is a read-only nonvolatile memory, and stores a program called BIOS (Basic Input/Output System). The BIOS is a program that is executed first when the image processing apparatus is activated, and controls the basic input/output functions of peripheral devices, such as a secondary storage device 105, a display device 107, an input device 109, and an output device 110. A RAM (Random Access Memory) 104 provides a storage area capable of high-speed read/write. The secondary storage device 105 is an HDD (Hard Disk Device) that provides a large-capacity storage area. When the BIOS is executed, an OS (Operating System) stored in the HDD is executed. The OS provides basic functions available in all applications, management of applications, and a basic GUI (Graphical User Interface). An application can provide a UI that implements an application-specific function by combining GUIs provided by the OS. If necessary, the execution programs of the OS and other applications, and data used for work are stored in the RAM 104 or secondary storage device 105.

A display control unit 106 controls operation to generate, as GUI image data, the result of a user operation performed for the OS or application, and display the GUI image data on the display device 107. The display device 107 can be a liquid crystal display or CRT (Cathode Ray Tube) display. An I/O control unit 108 provides interfaces with the input device 109 and output device 110. Typical interfaces are a USB (Universal Serial Bus) interface and PS/2 (Personal System/2) interface.

The input device 109 includes a keyboard and mouse for inputting a user instruction to the image processing apparatus. Further, the input device 109 can transfer image data by connecting a digital camera or a storage device, such as a USB memory, a CF (Compact Flash) memory, or an SD (Secure Digital) memory card. As the output device 110, a printer is connected and can provide a desired printing result.

Figure 2:
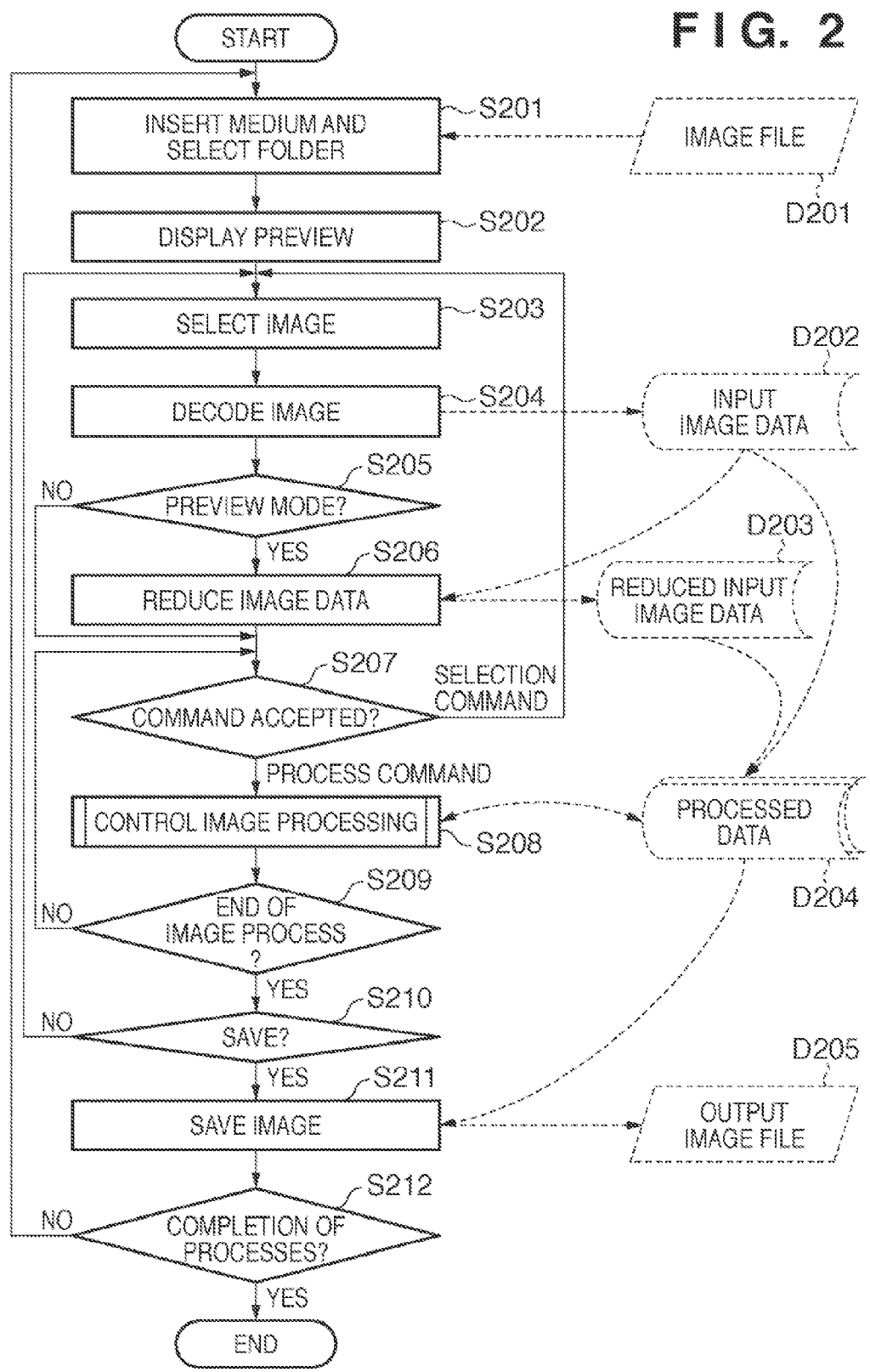
FIG. 2 is a flowchart of an overall sequence in the first embodiment.
Figure 6:
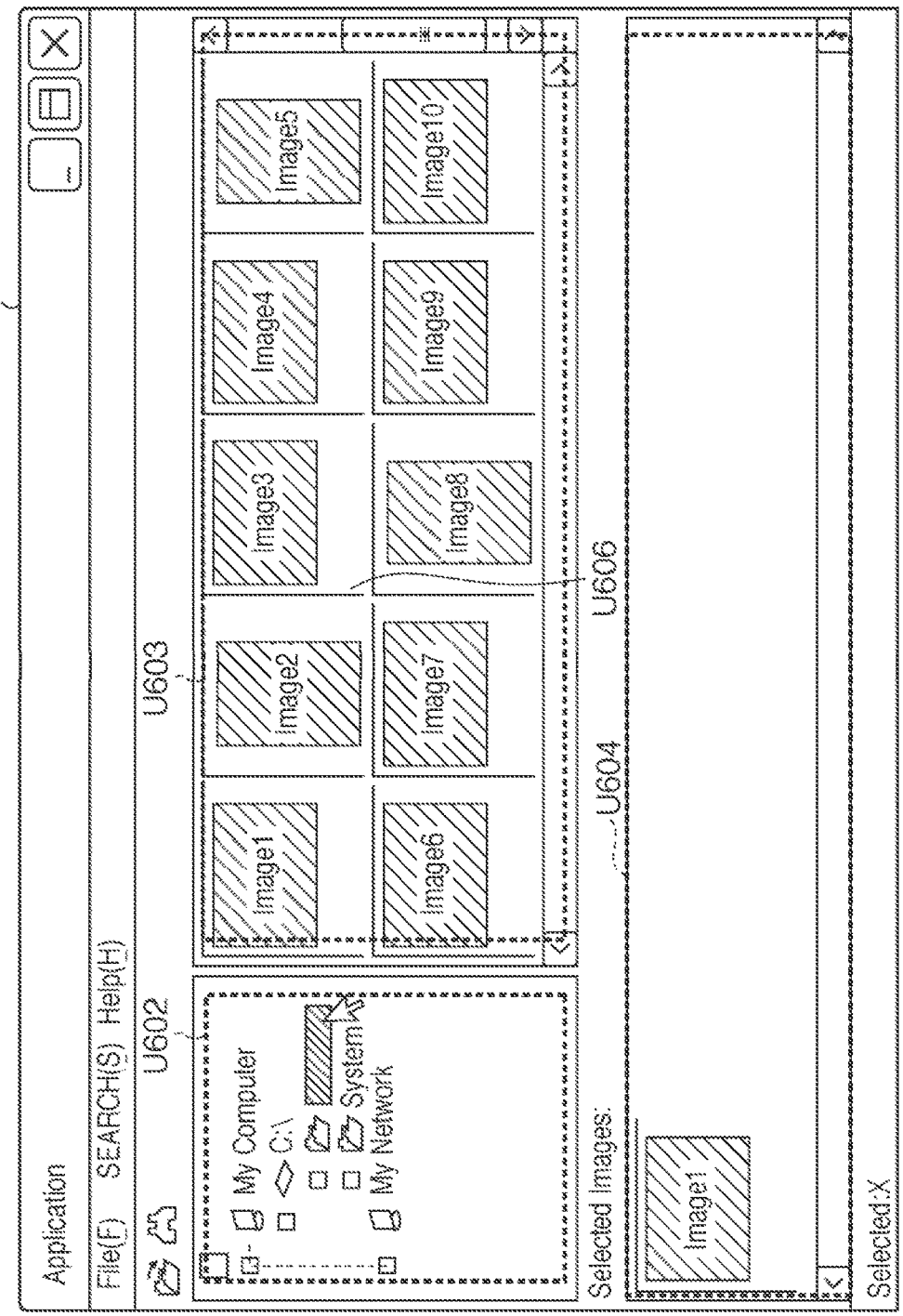
FIG. 6 is a view of an overall UI in the first embodiment.

An image correction application that implements the present invention is provided as an application that is stored in the secondary storage device 105 and activated by a user operation. FIG. 2 is a flowchart showing the characteristic operation of the image correction application. FIG. 6 exemplifies a UI (User Interface) after the image correction application is activated.

In FIG. 6, a folder selection UI U602, preview UI U603, and selected image preview UI U604 are arranged in an overall UI U601 of the image correction application. The folder selection UI U602 provides a function of selecting the storage location of an image file D201 that is stored in the secondary storage device 105 within the PC or the connected input device 109. The preview UI U603 provides a function of displaying the preview of the image file D201 at a selected storage location. The selected image preview UI U604 provides a function of displaying a preview list of images selected by the user from the preview UI U603 to execute a correction process. In the example of FIG. 6, the preview of the image file D201 in a My Photo folder is displayed, and the image file D201 named Image1 in this folder is selected as a correction target.

These operations correspond to steps S201 to S203 in FIG. 2. FIG. 2 shows the procedures of a program executed by the CPU 101. Step S201 of FIG. 2 is a state immediately after the image correction application is activated. Although not shown, a message screen is displayed to prompt the user to connect or to insert, to the PC, a storage device storing the image file D201, and prompts him to prepare image data.

The user designates the storage location of the image file D201 using the selected image preview UI U604. After the designation, the image correction application converts the image file D201 stored at the designated storage location into data capable of preview display, and displays the data on the preview UI U603 in step S202. The image file D201 will be exemplified as a generally popular JPEG (Joint Photographic Experts Group) file. In step S202, the image correction application extracts preview data stored as internal data of the JPEG file, converts it into an image format that can be displayed by the OS, changes the size to the display size of a preview, and displays the resultant image on the display device 107.

In step S203, the user designates the image file D201 to be corrected using the preview UI U603. A designated image file will be called an image file of interest, an image regarding the image file will be called an image of interest, and image data contained in the image file will be called image data of interest.

In step S204, the image correction application decodes the designated, JPEG-encoded image file D201, and converts the decoded file into input image data D202 of a processible format. As the processible format, image data of various formats, such as a DIB (Device Independent Bitmap) image and RAW image are available.

In step S205, the image correction application determines whether to perform a subsequent correction process in a preview mode targeting a preview-size image or an actual-size mode targeting input image data itself. Either mode is determined based on a user instruction. In the preview mode, the input image data D202 is processed at a preview size by changing the size of the image data in accordance with the display device 107, instead of processing the input image data D202 without changing the number of pixels. When the correction effect is confirmed in the preview mode and image data is finally saved at an actual size, the process efficiency becomes high, implementing a high-speed application as a whole. The actual size here means processing image data with the original numbers of vertical and horizontal pixels. At present, the number of photographing pixels of a digital camera exceeds several thousands in both the vertical and horizontal directions, and the entire image cannot be displayed on the display device 107, unless it is reduced. The preview size indicates the number of display pixels determined in accordance with the display resolution of the display device 107. The preview size suffices to be a size capable of visually confirming the result of an image process, and suffices to be about ½ to ⅓ of the actual size.

If the image correction application is to operate in the preview mode, it advances to step S206 to convert the input image data D202 into reduced input image data D203, and then advances to step S207. The criterion in step S205 is, for example, a selection by the user. The scaling ratio in step S206 is set to a value at which the size of the preview image after scaling becomes a predetermined one. When the predetermined size is set to the size of a preview display field (display field U706 in FIG. 7) in the displayed user interface of an image processing application, the entire image of interest can be displayed. The scaling ratio may be a predetermined value.

Figure 3:
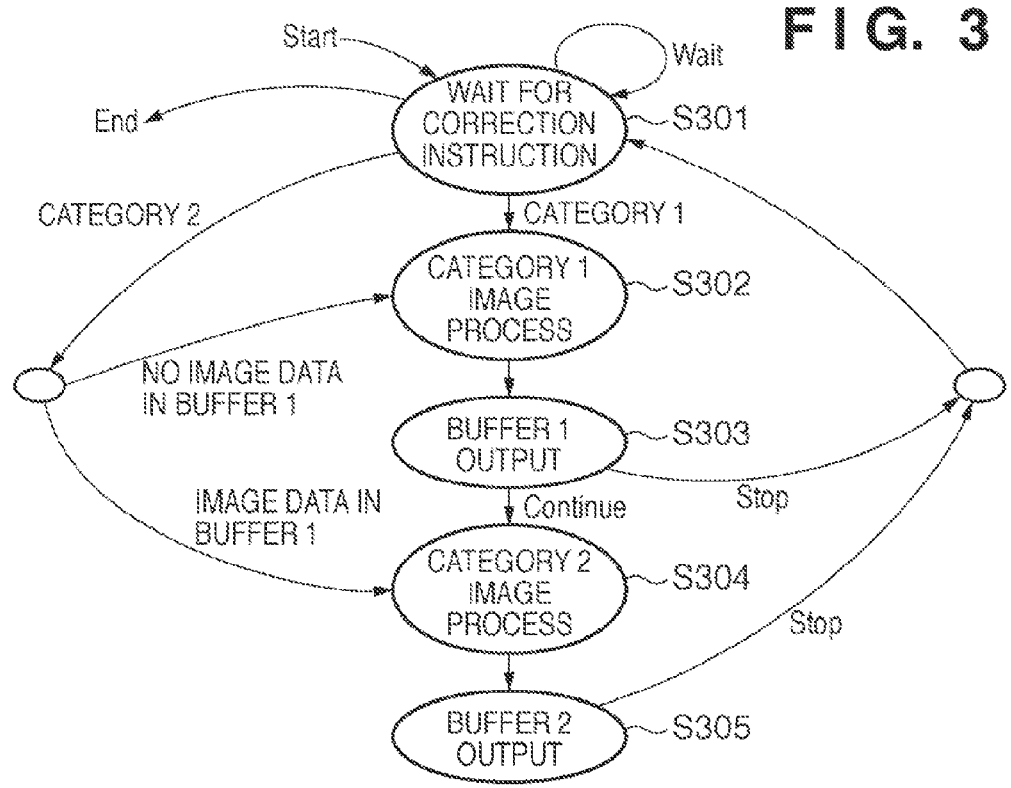
FIG. 3 is a view of the state transition of image processes in the first embodiment.
Figure 7:
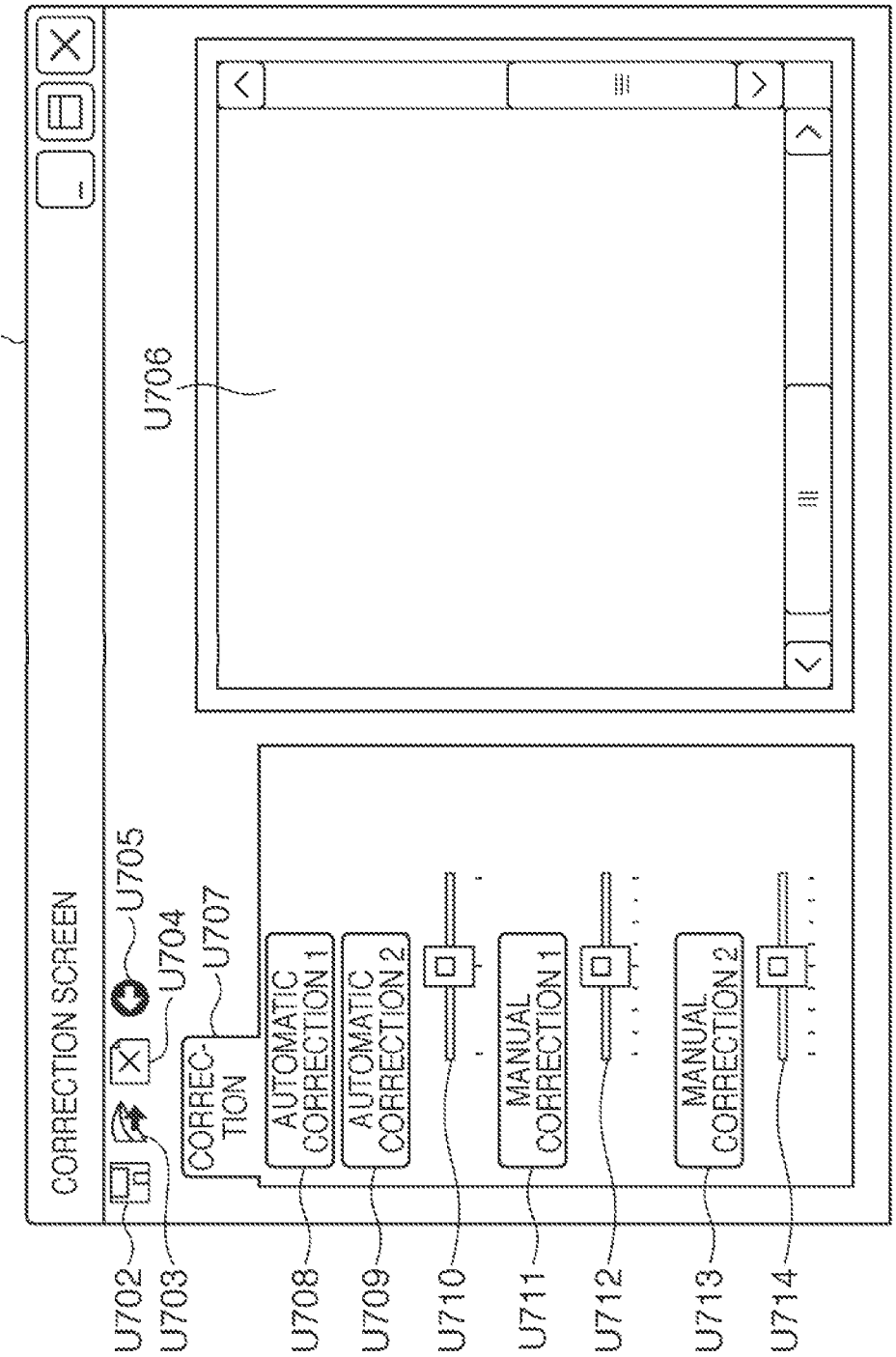
FIG. 7 is a view of an image process UI in the first embodiment.

In step S207 and subsequent steps, a UI shown in FIG. 7 is displayed instead of or in addition to the UI in FIG. 6. FIG. 3 shows the state transition of the image correction application from acceptance of a correction command in step S207 up to execution of an image process in step S208. The state transition in FIG. 3 will be described after the description of FIG. 2.

FIG. 7 shows an image correction UI U701. The image correction UI U701 is made up of an image correction instruction UI U707, the image correction result display UI U706, and other functional buttons U702 to U705. The UI in FIG. 7 shows a state in which the category 1 UI U707 is selected from provided correction functions. The image correction instruction UI U707 presents two automatic correction processes (automatic correction functions), that is, automatic correction 1 U708 and automatic correction 2 U709, and two manual correction functions, that is, manual correction 1 U711 and manual correction 2 U713. The automatic correction function includes contrast adjustment, white balance adjustment, face detection, red-eye correction, skin color correction, noise removal, and filter processing for sharpness and defocusing. Manual correction includes, for example, individual processes contained in automatic correction. In manual correction, however, the user can designate an area to be processed, the degree of process, and the like, by parameters.

In the automatic correction 1 U708, the ON/OFF state of the correction function can be designated. In the automatic correction 2 U709, the ON/OFF state of the correction function can be designated, and when the correction function is ON, the degree of the correction effect can be designated using a slider bar U710. In the manual correction 1 U711 and manual correction 2 U713, the ON/OFF state of the correction function can be designated, and the degree of the correction effect can be designated using corresponding slider bars U712 and U714.

The save button U702 is a UI that provides the save function. When the user presses the save button U702, commands (image process instructions) input at that time are executed in a predetermined order for image data of interest, and the process result is saved. The image selection button U703 is a UI that provides a function of closing the correction UI U701, returning to the overall UI U601, and selecting an image again. The cancel button U704 is a UI that provides a function of canceling all designated correction functions. The return button U705 is a UI that provides a function of canceling only one final designated correction function. A UI (not shown) can provide various other functions. The image correction result display (preview) UI U706 displays the correction result.

<Image Process>

FIG. 3 shows a state transition when the UI shown in FIG. 7 is manipulated to correct image data. Correction instruction wait state S301 corresponds to acceptance of a correction command from the user in step S207. When the ON/OFF states of the automatic correction 1 U708 and automatic correction 2 U709 are designated, and the value of the slider bar U710 is designated, the image correction application advances to category 1 image process state S302 to execute an image process in accordance with the designated value. The process target is the input image data D202 in the actual-size mode, and the reduced input image data D203 in the preview mode.

In FIG. 3, an image process is executed in state S302, regardless of the type of image process, as long as it is classified into category 1. After the end of the image process classified into category 1, the image correction application advances to buffer output state 1 S303, to output the correction result to intermediate buffer 1. In the first embodiment, the execution order of image processes is determined in advance. Thus, the completion of an image process that is executed last among image processes belonging to category 1 means the end of image processes belonging to category 1. Details of the output process will be explained later. Upon completion of the output, that is, storage in intermediate buffer 1, the image correction application returns to correction instruction wait state S301. Note that automatic processes in category 1 are a set of processes, so processed image data may be displayed upon completion of all the automatic processes, instead of displaying individual image process results.

In correction instruction wait state S301, the user designates the ON/OFF state of the manual correction 1 U711, and the correction degree of the manual correction 1 U711 using the slider bar U712. Further, the user designates the ON/OFF state of the manual correction 2 U713, and the correction degree of the manual correction 2 U713 using the slider bar U714. After the end of the designation, the image correction application advances to category 1 image process state S302 or category 2 image process state S304. Transition to either step is determined as follows.

If image data has been saved in intermediate buffer 1, the image correction application advances to category 2 image process state S304, and executes an image process classified into image processes of category 2 for the image data in intermediate buffer 1. However, even if image data has been written, data that has already been saved or discarded is not valid, and such image data is regarded not to exist. If no image data exists in intermediate buffer 1, the image correction application advances to category 1 image process state S302 to execute an image process in category 1 image process state S302. Upon completion of the process, the image correction application stores the processed image data in intermediate buffer 1 in buffer output 1 state S303, and advances to category 2 image process state S304, to execute an image process of category 2.

In category 2 image process state S304, the image process targets image data stored in intermediate buffer 1. After the image correction application executes the process for image data in intermediate buffer 1 and completes it, the image correction application advance to buffer output state 2 S305, to output the process result to intermediate buffer 2. Since the process of category 2 is manual correction, in this example, image data in intermediate buffer 2 is displayed in the preview field of the UI every time each designated image process is completed. Every time the user designates an image process, he can refer to an image processed in accordance with the instruction.

Figure 4:
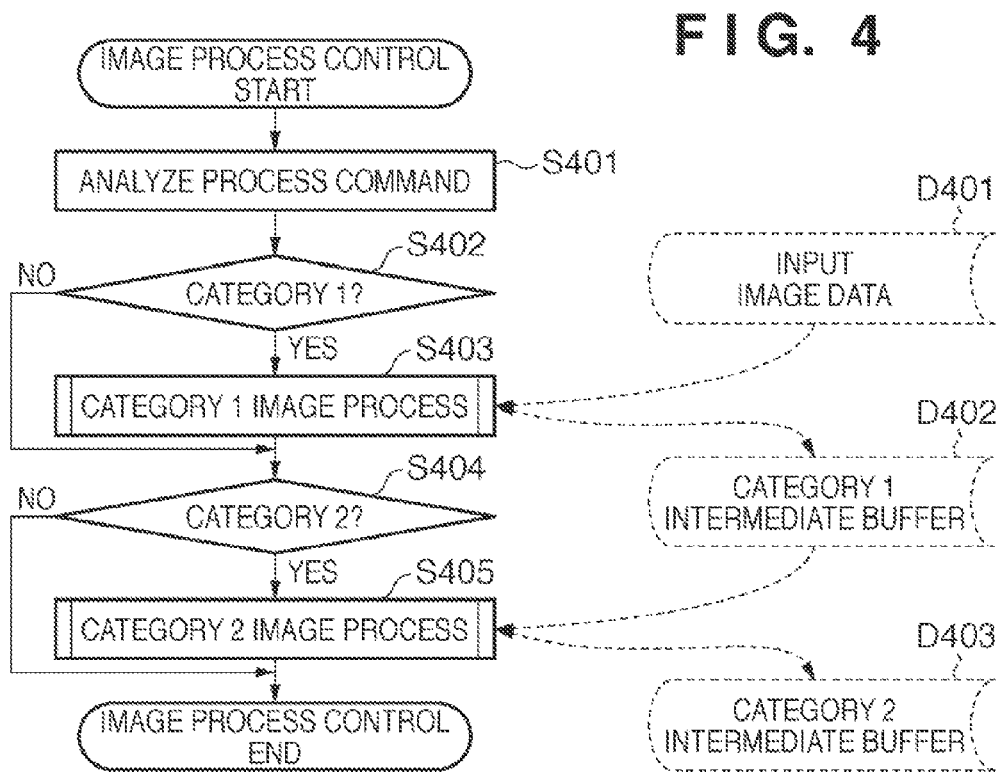
FIG. 4 is a flowchart of image processes in the first embodiment.

FIG. 4 is a flowchart showing in detail the process in step S208 of FIG. 2. In FIG. 4, an exceptional process, such as an abnormal end, and a process of controlling the UI in FIG. 7, are omitted. Upon receiving a correction control command in step S207, the image correction application determines, based on the type of command, whether to advance to step S208 or step S203. If the correction control command concerns a correction instruction to validate the automatic correction 1 button U708, the image correction application advances to step S208 to execute processes in steps S401 to S405 in step S208. If the correction control command is input by selecting the image selection button U703, the image correction application advances to step S203, and the user can select again an image to be corrected.

In step S208, the process in FIG. 4 is executed. In step S401, the designated correction control command is analyzed. More specifically, an image correction control sequence is obtained to reflect a correction designated by the user via the image correction UI U701. As described above, image data to be processed is determined based on whether the preview mode is set. In step S402, the image correction application determines whether to execute automatic correction 1 or 2 of an image process classified into category 1. If automatic correction 1 or 2 is to be executed, the image correction application advances to step S403; if NO, to step S404. The determination in step S402 is made based on a user operation (that is, input command). More specifically, if the user presses a button designating automatic correction 1 or 2 in the UI U701, the image correction application determines to execute a process of category 1.

Figure 5:
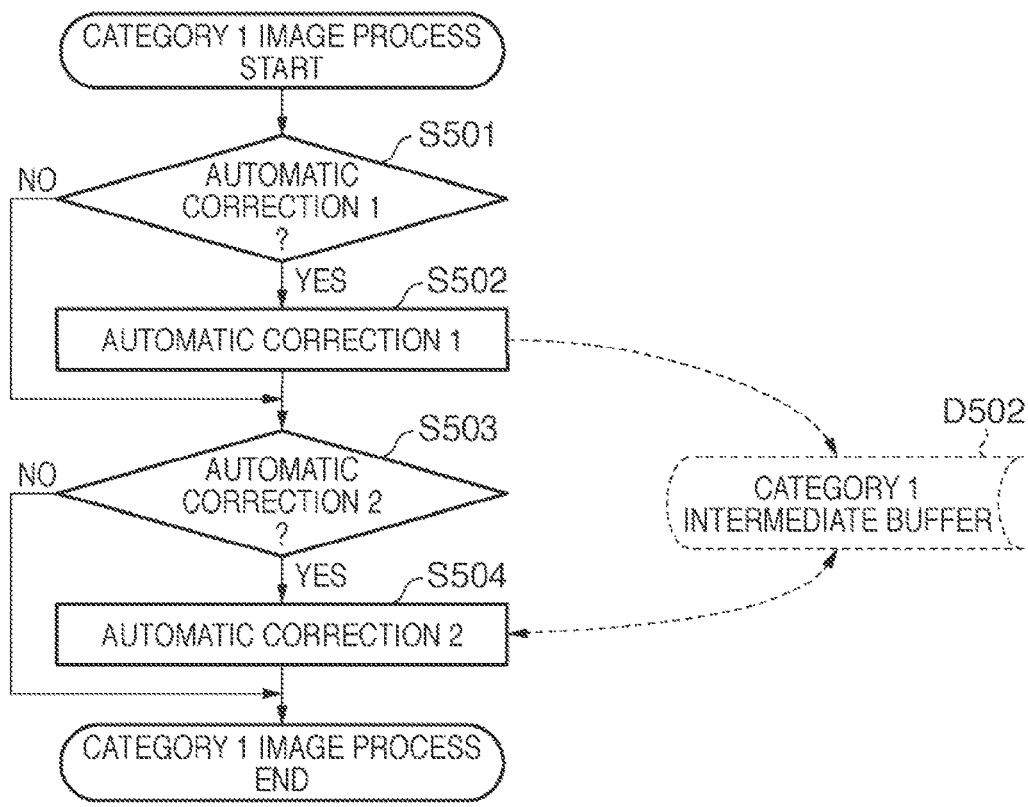
FIG. 5 is a flowchart of detailed image processes in the first embodiment.

FIG. 5 shows the internal process in step S403. In FIG. 5, an exceptional process, such as abnormal end, and a process of controlling the UI in FIG. 7, are omitted. In step S501, the image correction application determines whether to execute automatic correction 1. Similar to step S402, this determination is made based on a user input. If the image correction application determines to execute automatic correction 1, that is, the automatic correction 1 button U708 is ON, the image correction application executes the process of automatic correction 1 for input image data D401. The image correction application outputs the correction result to a category 1 intermediate buffer D502, and advances to step S503. The category 1 intermediate buffer D502 is the same as a category 1 intermediate buffer D402 in FIG. 4, and also the same as intermediate buffer 1 in FIG. 3.

After the end of the process of automatic correction 1, or if the image correction application determines, in step S501, not to execute automatic correction 1, the image correction application advances to step S503, to determine whether to execute automatic correction 2. If the image correction application determines in step S503, to execute automatic correction 2, that is, the automatic correction 2 button U709 is ON, it advances to step S504.

In step S504, the image correction application executes automatic correction 2 at a correction degree designated with the slider bar U710 for output data of automatic correction 1 that is stored in the category 1 intermediate buffer D502. The image correction application overwrites the category 1 intermediate buffer D502 with the process result. If no process of automatic correction 1 is designated, and the category 1 intermediate buffer D502 does not exist or no valid value is stored, the image correction application uses the input image data D401 as input data of automatic correction 2. Accordingly, the correction process designated via the category 1 U707 is executed as instructed.

After the end of the process of automatic correction 2, or if the image correction application determines, in step S503, not to execute automatic correction 2, the image correction application advances to step S404, to determine whether to execute a process of category 2. Control for manual correction 1 and manual correction 2 that are classified into category 2 is basically the same as the sequence described in steps S402, S403, and S501 to S504, and a description thereof will not be repeated. However, input data for processes of manual correction 1 and manual correction 2 are different. If the process of neither automatic correction 1 nor automatic correction 2 has been executed, the input data is the input image data D401. If both or either the processes of automatic correction 1 and automatic correction 2 has been executed, the input data is data in the category 1 intermediate buffer D402. As a process parameter, a manually input value is employed. The storage destination of processed data is a category 2 intermediate buffer D403. This is the internal sequence in step S208. As the input image data D401, either the input image data D202 or reduced input image data D203 is used selectively, in accordance with the operation mode. The category 1 intermediate buffer D402 and category 2 intermediate buffer D403 correspond to processed data D204 in FIG. 2.

After the end of these processes, the image correction application advances to step S209. In step S209, the image correction application determines whether to successively change the correction instruction. If the user presses the save button U702 or cancel button U704, the image correction application advances to step S210. If the image correction application determines, in step S210, that the user has pressed the cancel button U704, it advances to step S203, to start the process again from image selection. If the user has pressed the save button U702, the image correction application advances to step S211 to save, as an output image file D205, data that has undergone various correction processes, and is stored in the processed data D204. Then, the image correction application advances to step S212. When the preview mode has been selected, reduced input image data having undergone the image process is saved, and thus, the same process needs to be executed again in the actual-size mode. To omit this labor, it is also possible to perform the image process for only the reduced input image data D203 during the operation in the preview mode, and to save the history of image process commands. In this case, the image process is executed for the input image data D202 in accordance with the history saved when the save button was pressed, and the result of the image process is saved. In the first embodiment, a reduced image for preview is created prior to a process. It is also possible to execute the image process itself for the input image data D202, and to create reduced input image data for preview display every time the image process is executed. If the user presses the end button U711 in step S212, the image correction application closes the correction UI U701 and returns to the image selection UI U601. If the user selects an image correction application end menu (not shown), the whole application is closed and ends.

The above-described process sequence of the image correction application is a sequence of selecting one image and executing various correction processes. In practice, the image correction application has a sequence of selecting a plurality of images and executing the same process at once, and a sequence of performing the correction process while switching a plurality of images. However, these sequences are not related to the gist of the present invention, and a description thereof will be omitted.

In the first embodiment, correction processes are classified into category 1 and category 2. Category 1 includes automatic correction 1 and automatic correction 2, and category 2 includes manual correction 1 and manual correction 2. The automatic correction can adopt a correction process of analyzing the histogram of an image, and automatically adjusting the contrast of the entire image or correcting the WB (White Balance). As more advanced correction, an automatic correction function can be assigned to detect an object serving as a main subject, such as a face in image data, and correct the image to higher image quality using the detection result. It is also possible to assign a function of correcting poor image quality, such as the red-eye or noise, and a function of automatically generating a 2D filter for sharpness and defocusing, and processing an image. Various other correction functions are also usable. In general, an appropriate parameter can be given in advance, and correction executable using the parameter can be classified into automatic correction. The manual correction can use basic correction functions, such as color balance correction and contrast correction. As another correction process, a face area or a red-eye area may be designated by the user, and corrected to aid the automatic correction function. In manual correction, the user may designate the size and shape of the filter for the filter process to perform correction. In general, correction in which it is difficult to give a proper parameter in advance, and the intervention of the operator is necessary every time the correction process is executed, can be classified into manual correction.

In the above description, image correction includes two automatic correction processes and two manual correction processes. Needless to say, the number of automatic or manual correction processes is not limited to two, and the classification and the combination of functions are not limited to the foregoing ones.

As described above, according to the first embodiment, correction processes for an image are classified into two categories, that is, automatic correction and manual correction, and the automatic correction is executed prior to the manual correction. The manual correction is executed for the process result of the automatic correction. The user can correct an image based on the correction result of the automatic correction or while referring to the correction result of the manual correction. More advanced automatic correction tends to prolong the time of the process of the automatic correction system, compared to the process of the manual correction system. It is preferable to employ a sequence of displaying the result of correction generally classified into manual correction, and determining the correction amount by the user while confirming the effect. For this reason, manual correction requires a quick response. According to the first embodiment, manual correction is done based on the process result of automatic correction, so no automatic correction need be performed again every time the manual correction parameter is changed to execute the manual correction again. This can increase the response speed.

Even in manual correction, an image correction function using a filter takes a relatively long process time. Hence, it is preferable to classify, into the same category 1 as that of automatic correction, a correction process that uses a filter and takes a long process time, and to limit manual correction processes belonging to category 2 to color balance correction, contrast correction, and the like, which take short process times. Processes such as color balance correction and contrast correction preferably employ an algorithm that copes with high speed using an LUT (LookUp Table). The reason why the filter process is classified into category 1 is that the process order is fixed, so that manual correction is done after a process requiring a relative long process time. Even if the filter process is classified into the same category as that of automatic correction, the processed image data is displayed as a preview upon completion of one automatic correction process or upon completion of the filter process. The order of the automatic correction and filter process is desirably determined in advance to eliminate dependence on the order.

As described in the first embodiment, manual correction is executed after automatic correction having a long process time. The category 1 intermediate buffer D502 holds the result of automatic correction. When only a manual correction instruction is changed, it is important to quickly respond by performing manual correction using the category 1 intermediate buffer D502. This image process sequence has even an effect of maintaining the order of image processes.

As described in the first embodiment, holding data in the category 1 intermediate buffer D502 consumes the resource of the RAM 104 or secondary storage device 105 of the PC. To prevent this, when the user confirms the correction result on the display device 107, the image size is reduced in the preview mode, and image correction is performed. This can decrease the resource consumption amount and increase the process speed.

When the same correction process is executed simultaneously for a plurality of images, the category 1 intermediate buffer D502 need not be created, though no detailed sequence has been described in particular in the first embodiment. This sequence may skip the process of creating the category 1 intermediate buffer D502.

Second Embodiment

In the first embodiment, image correction processes are classified by function into categories. However, it is sometimes preferable to classify image correction processes, not by function, but by UI. In the second embodiment, image correction functions are classified by UI. The same part of the basic sequence as that in the first embodiment will not be repeated, and only a characteristic part of the second embodiment will be explained with reference to FIGS. 8, 9, 10, and 11.

Figure 8:
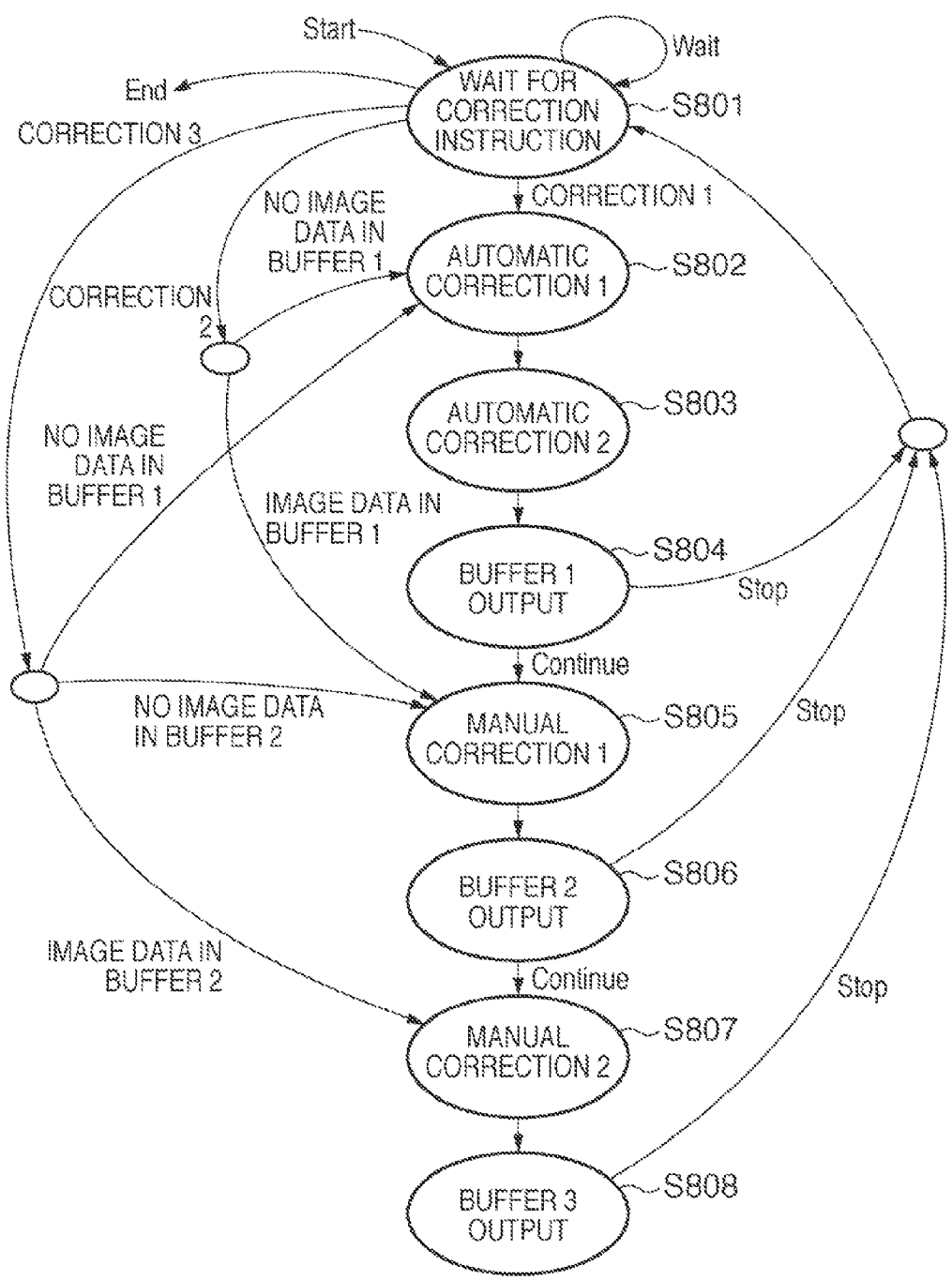
FIG. 8 is a view of the state transition of image processes in the second embodiment.
Figure 9:
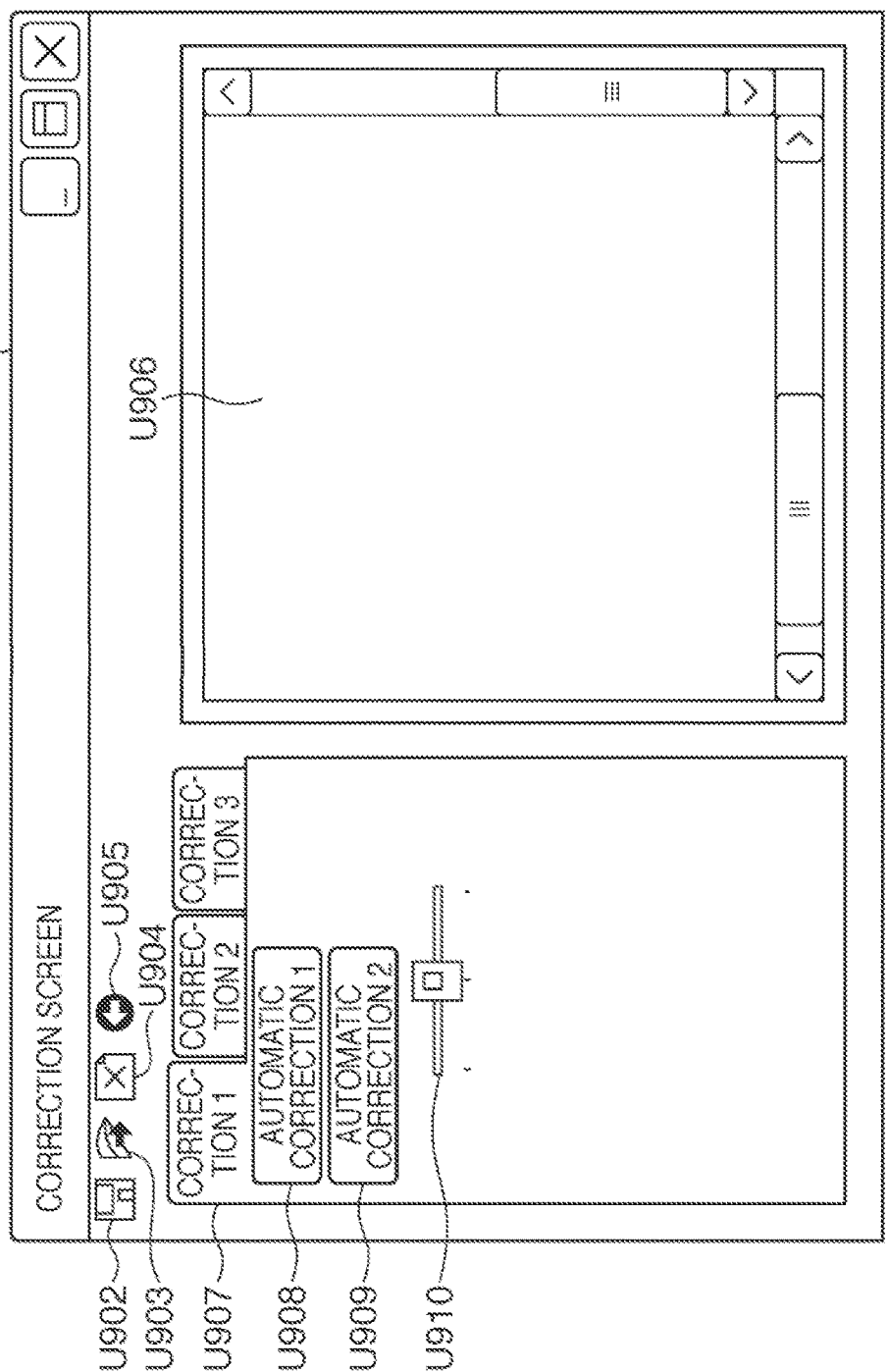
FIG. 9 is a view of the image process UI of correction 1 in the second embodiment.
Figure 10:
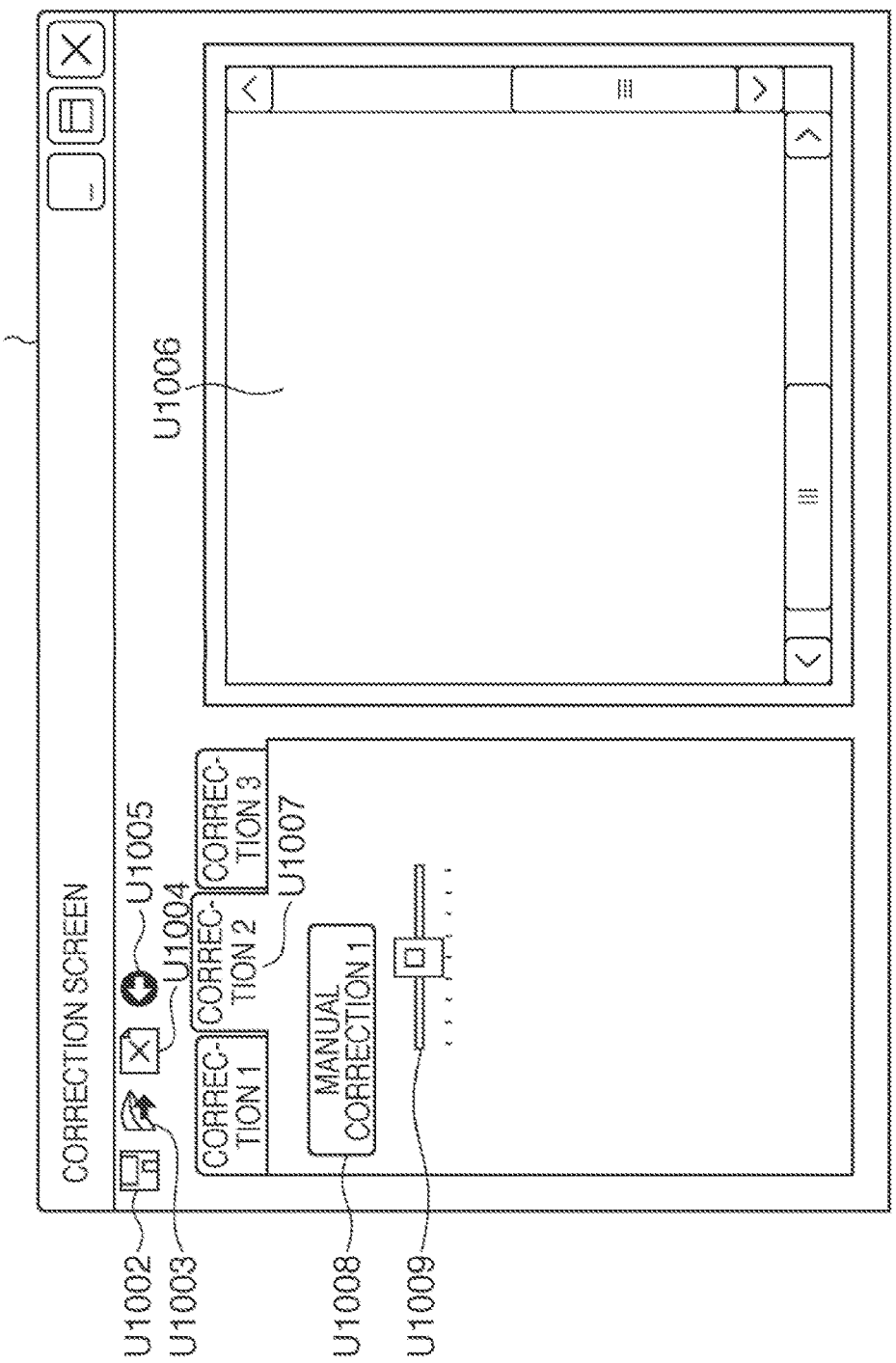
FIG. 10 is a view of the image process UI of correction 2 in the second embodiment.
Figure 11:
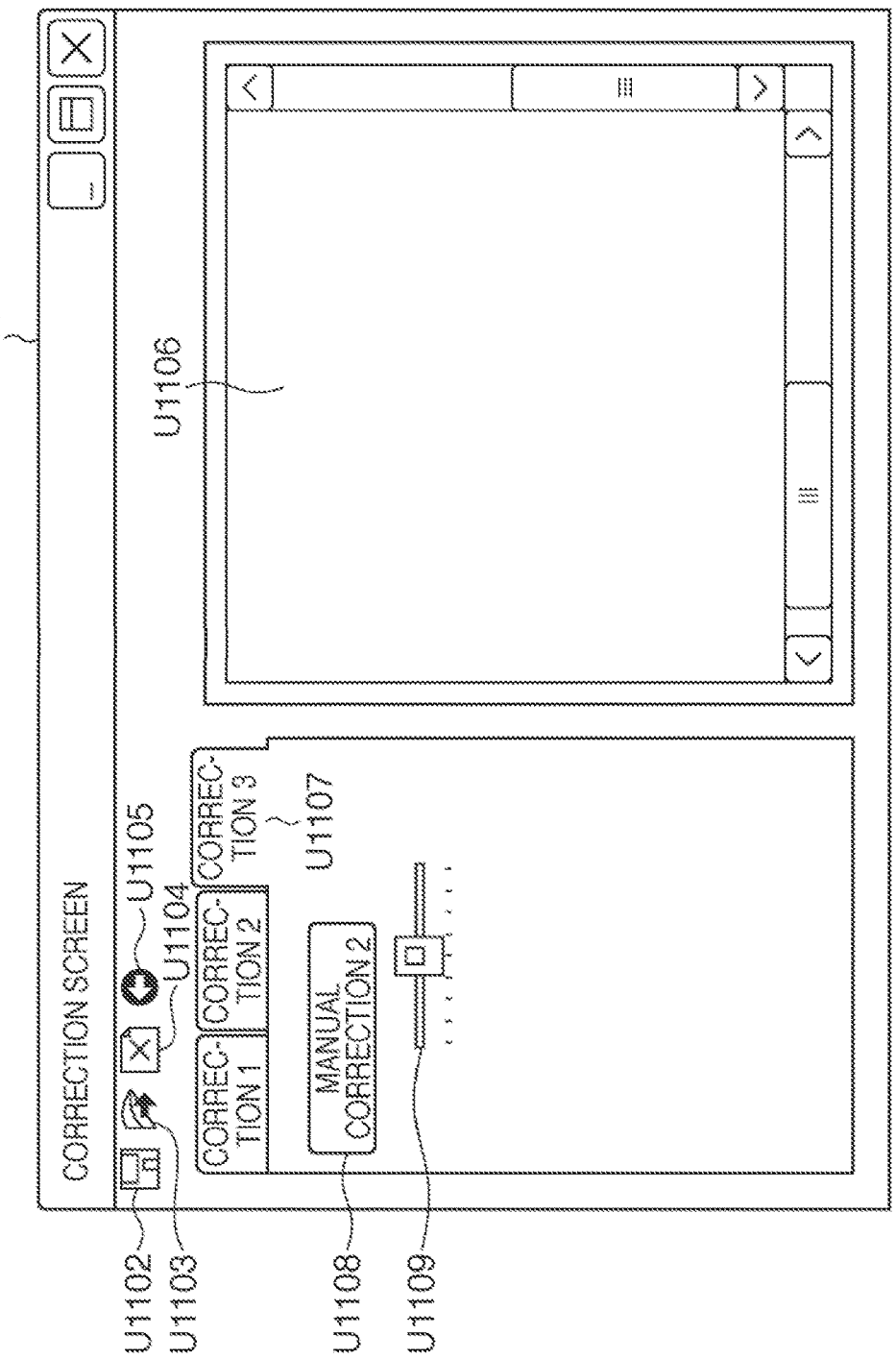
FIG. 11 is a view of the image process UI of correction 3 in the second embodiment.
Figure 12:
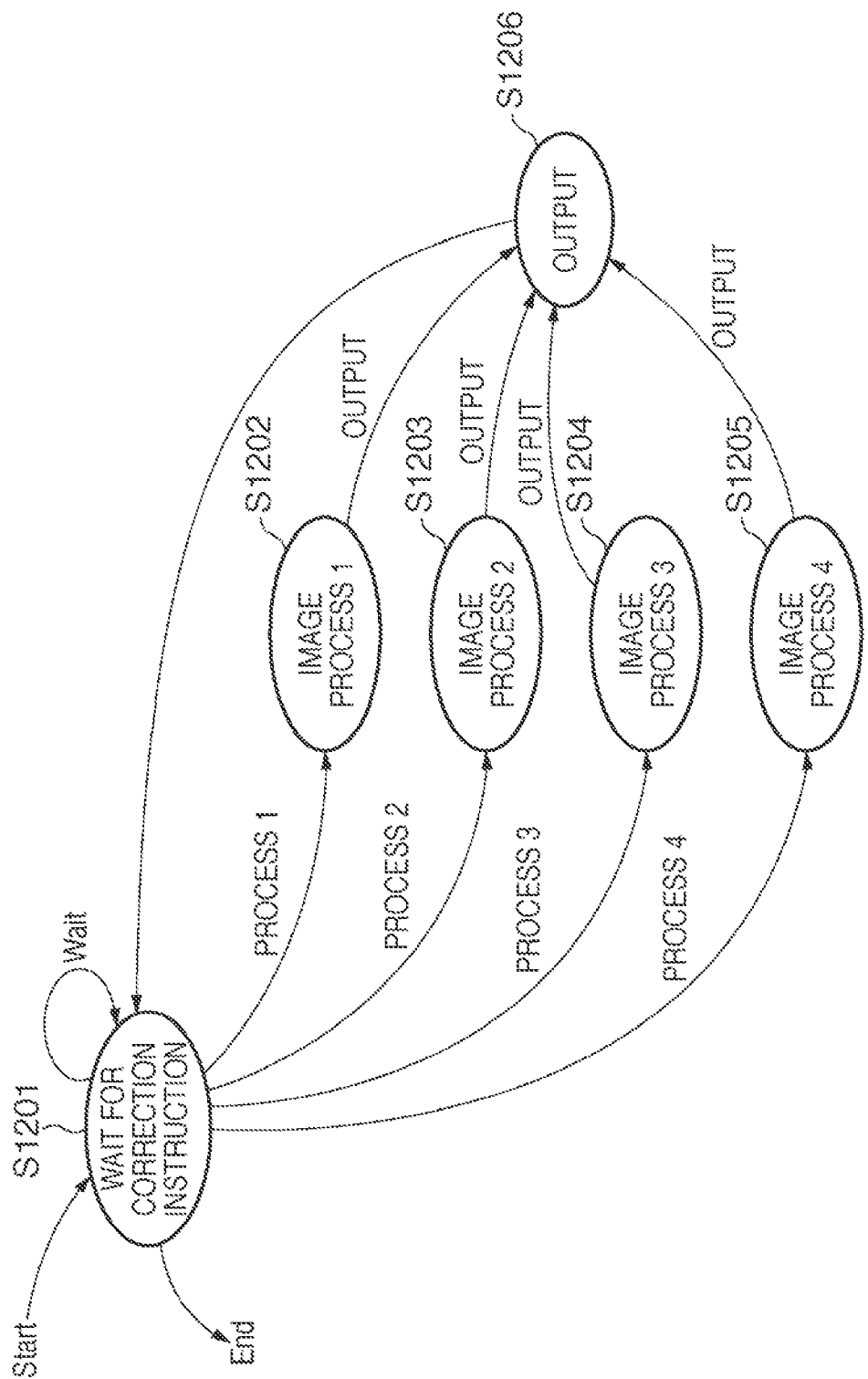
FIG. 12 is a view of the state transition of a photo retouching application.
Figure 13:
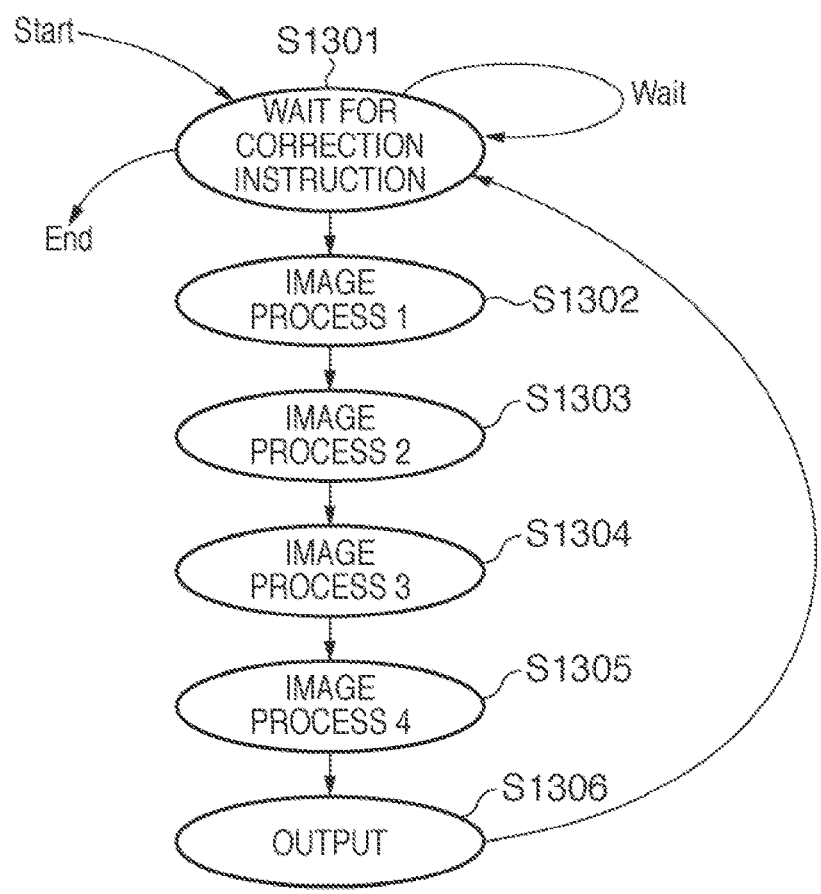
FIG. 13 is a view of the state transition of an image processing application.
Figure 14:
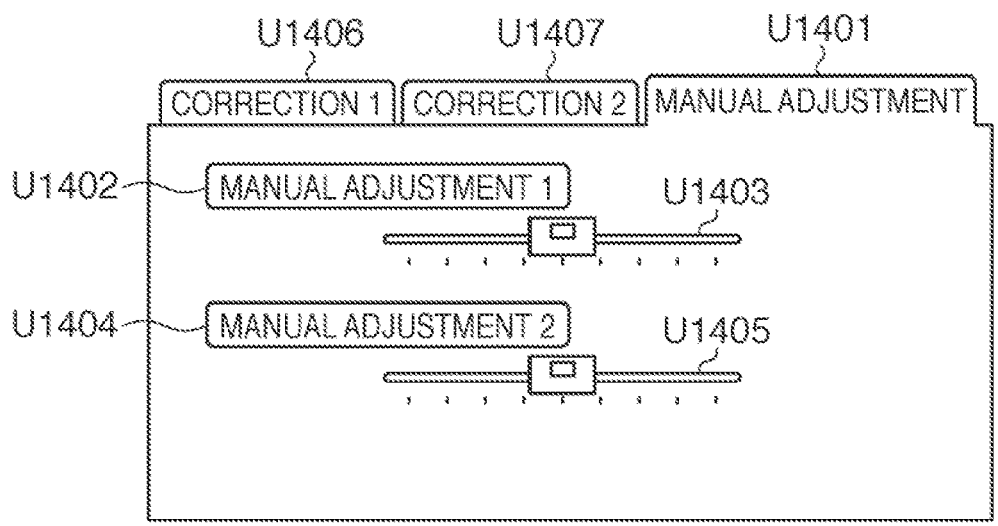
FIG. 14 is a view exemplifying the UI of the manual adjustment function of the image processing application.

FIG. 8 is a view showing the state transition of image processes in an image correction application according to the second embodiment. FIGS. 9 to 11 exemplify UIs. As shown in FIGS. 9, 10, and 11, image correction functions are classified into three categories, that is, correction 1 U907, correction 2 U1007, and correction 3 U1107, and corresponding UIs are prepared. Two correction functions, that is, automatic correction 1 U908 and automatic correction 2 U909 are assigned to the correction 1 U907. The automatic correction 1 U908 allows only the ON/OFF control. In addition to the ON/OFF control, the automatic correction 2 U909 allows the user to designate the correction degree using a slider bar U910. Manual correction 1 U1008 is assigned to the correction 2 U1007. In addition to the ON/OFF control, the manual correction 1 U1008 allows the user to designate the correction degree using a slider bar U1009. Manual correction 2 U1108 is assigned to the correction 3 U1107. In addition to the ON/OFF control, the manual correction 2 U1108 allows the user to designate the correction degree using a slider bar U1109.

FIG. 8 is a view showing the state transition of the second embodiment that replaces FIG. 3 in the first embodiment. In correction instruction wait state S801, the UI of one of the correction 1 U907, correction 2 U1007, and correction 3 U1107 has been selected, and a correction instruction from the user can be accepted. If the user designates the correction 1 U907 and designates the automatic correction 1 U908 or automatic correction 2 U909 in correction instruction wait state S801, the image correction application transits to automatic correction 1 state S802. If the automatic correction 1 U908 is ON, the image correction application executes the process of automatic correction 1 in automatic correction 1 state S802. At this time, input image data D202 or reduced input image data D203 described in the first embodiment is used as input data in accordance with the operation mode. If the automatic correction 1 U908 is OFF, the image correction application does not execute any process. If the process of automatic correction 1 ends in automatic correction 1 state S802, the image correction application transits to automatic correction 2 state S803.

If the automatic correction 2 U909 is ON, the image correction application executes the process of automatic correction 1 in automatic correction 1 state S802. If the automatic correction 1 U908 is ON, the image correction application executes the process of automatic correction 2 for image data that has been processed in automatic correction 1 state S802. If the automatic correction 1 U908 is OFF, the image correction application processes the input image data D202 or reduced input image data D203. After the end of the process of automatic correction 2 in automatic correction 2 state S803, the image correction application transits to buffer 1 output state S804.

In buffer 1 output state S804, the image correction application outputs, to intermediate buffer 1, the process results of automatic correction 1 and automatic correction 2 that have been executed in automatic correction 1 state S802 and automatic correction 2 state S803.

If image data during the process is output to intermediate buffer 1, the image correction application determines whether to successively advance to manual correction 1 state S805. In this example, the correction 1 UI U907 is designated to perform the process. Thus, the image correction application does not transit to manual correction 1 state S805, and returns to correction instruction wait state S801 to wait for the next correction instruction.

If the user designates the correction 2 U1007 in correction instruction wait state S801, validates the manual correction 1 U1008, and changes the designated value of the slider bar U1009, the image correction application transits to either automatic correction 1 state S802 or manual correction 1 state S805. The branch is determined based on whether or not image data during the process has been output to intermediate buffer 1. If no image data has been output to intermediate buffer 1, the image correction application transits to automatic correction 1 state S802. If image data has been output to intermediate buffer 1, the image correction application transits to manual correction 1 state S805.

If no image data has been output to intermediate buffer 1, the image correction application transits to automatic correction 1 state S802, and executes a correction process corresponding to the automatic correction 1 U908, the automatic correction 2 U909, and the value of the slider bar U910 in automatic correction 1 state S802 and automatic correction 2 state S803. The image correction application outputs the result to intermediate buffer 1 in buffer 1 output state S804, and transits to manual correction 1 state S805.

If image data having undergone automatic correction has been output to intermediate buffer 1, the image correction application transits to manual correction 1 state S805. In manual correction 1 state S805, the image correction application executes the process of manual correction 1 corresponding to the manual correction 1 U1008 and the set value of the slider bar U1009 using image data of intermediate buffer 1 as an input. Thereafter, the image correction application transits to buffer 2 output state S806. In buffer 2 output state S806, the image correction application outputs, to intermediate buffer 2, image data that is the result of processes up to manual correction 1 state S805. After outputting the image data to intermediate buffer 2, the image correction application determines whether to successively advance to manual correction 2 state S807. In this example, the correction 2 U1007 is designated to perform the process. Thus, the image correction application does not transit to manual correction 2 state S807, and returns to correction instruction wait state S801 to wait for the next correction instruction.

If the user designates the correction 3 U1107 in correction instruction wait state S801, validates the manual correction 2 U1108, and changes the designated value of the slider bar U1109, the image correction application transits to one of automatic correction 1 state S802, manual correction 1 state S805, and manual correction 2 state S807. The branch is determined based on whether or not image data during the process have been output to intermediate buffer 1 and intermediate buffer 2.

If no image data has been output to intermediate buffer 1, the image correction application transits to automatic correction 1 state S802 regardless of the state of intermediate buffer 2. A subsequent operation is the same as the operation for the correction 2 image data U1007, and a description thereof will not be repeated. If image data has been output to intermediate buffer 1, and no image data during the process has been output to intermediate buffer 2, the image correction application transits to manual correction 1 state S805. A subsequent operation of advancing from manual correction 1 state S805 to buffer 2 output state S806 is the same as that described above. In this case, however, the image correction application determines in buffer 2 output state S806 to transit to manual correction 2 state S807.

In manual correction 2 state S807, the image correction application executes the process of manual correction 2 corresponding to the manual correction 2 U1108 and the set value of the slider bar U1109 using image data in intermediate buffer 2 as an input. The image correction application then transits to buffer 3 output state S808. In buffer 3 output state S808, the image correction application outputs, to intermediate buffer 3, image data that is the result of processes up to manual correction 2 state S807. If the image data during the process is output to intermediate buffer 3, the image correction application returns to correction instruction wait state S801 to wait for the next correction instruction.

In this description, intermediate buffers 1 to 3 correspond to processed data D204 in FIG. 2.

The user can obtain a desired correction result by switching between the correction 1 U907, the correction 2 U1007, and the correction 3 U1107, and controlling a correction function usable at that time. The second embodiment can provide an image correction application capable of a quick response, because only a minimum number of processes are executed for each correction classification according to the above-described image sequence, while maintaining the order of image processes.

When image correction functions are classified into three categories, and then presented to the user in the foregoing way, many image correction functions are arranged, and the user can easily analogize the effect of image correction. To display a UI for controlling many correction functions at once, the display area needs to be increased, and each display becomes small, decreasing the degree of freedom of the UI. Further, the display area of a recent small-size information terminal, such as a Netbook computer, is originally small, and cannot display many functions at once. It is, therefore, important to ensure the degree of freedom of the UI. The second embodiment solves these problems regarding the UI, in addition to the effects of the first embodiment.

The number of process categories is not limited to two or three, and may be more. It is necessary to determine the order of categories to which image processes belong, prepare an intermediate buffer for delivering image data between categories, save a process result in the intermediate buffer for each category, and execute the process of the next category for image data in the intermediate buffer. When classifying a process to a category, it is desirable to classify processes into those of long process times and those of short process times based on, for example, the process time. In the first embodiment, processes of long process times are classified into the first category, and those of short process times are classified into the second category. It is difficult to simply compare process times. Hence, it suffices to classify processes into those whose process times are highly likely to be long, and those whose process times are highly likely to be short. It suffices to empirically determine the threshold.

Modification to Second Embodiment

The second embodiment has described an image processing method of providing an image process sequence capable of a quick response so that the user can easily grasp image processes using a UI that categorizes image processes, while holding the order of image processes. By meeting a request to save the correction result of previous processes during the image process sequence in the second embodiment, a more convenient image process sequence can be provided to the user. More specifically, a step of saving the processed data D204 as the output image file D205 in step S211 of FIG. 2 is added in buffer 1 output state S804, buffer 2 output state S806, and buffer 3 output state S808 in FIG. 8. When the process of saving image data for which all image processes have not been completed is added, saved data is processed as the input image data D202 of a subsequent image process sequence. Accordingly, an image process sequence with the save function added during correction can be implemented.

Other Embodiments

Aspects of the present invention can also be realized by a computer of a system or an apparatus (or devices, such as a CPU or an MPU) that reads out and executes a program recorded on a memory device, to perform the functions of the above-described embodiment(s), and by a method, the steps of which are performed by a computer of a system or an apparatus by, for example, reading out and executing a program recorded on a memory device to perform the functions of the above-described embodiment(s). For this purpose, the program is provided to the computer, for example, via a network or from a recording medium of various types serving as the memory device (for example, a computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

We claim:

1. An image processing apparatus comprising:
(A) a storage;
(B) a processor; and
(C) a memory storing instructions which, when executed by the processor, cause the image processing apparatus to function as:
(a) a first correction unit configured (i) to perform a first type of correction for original image data, based on a result of analysis of the original image data, to produce corrected image data, and (ii) to store the corrected image data in said storage;
(b) a second correction unit configured to perform a first type of manual correction for the image data stored by said storage, using a correction parameter in accordance with a user instruction; and
(c) a third correction unit configured to perform a second type of correction for the original image data, based on a result of analysis of the original image data, in a case when a second type of correction instruction based on an image analysis is input, after the first type of manual correction is performed by the second correction unit, the second type of correction being different from the first type of correction performed by the first correction unit.

2. The apparatus according to claim 1, wherein said first correction unit is configured to perform white balance adjustment for the original image data based on a result of analyzing a histogram of the original image data.

3. The apparatus according to claim 1, wherein said third correction unit is configured to perform contrast correction for the original image data based on a result of analyzing a histogram of the original image data.

4. The apparatus according to claim 1, wherein said first correction unit is configured to perform a correction using a lookup table.

5. An image processing method comprising:
inputting image data;
performing a first type of correction for original image data, based on a result of analysis of the original image data and producing corrected image data;
storing the corrected image data in a storage;
performing a first type of manual correction for the image data stored in said storing, using a correction parameter in accordance with a user instruction; and
performing a second type of correction for the original image data, based on a result of analysis of the original image data, in a case when a second type of correction instruction based on an image analysis is input, after the first type of manual correction is performed, the second type of correction being different from the first type of correction.

6. The method according to claim 5, wherein said performing a first type of correction includes performing white balance adjustment for the original image data based on a result of analyzing a histogram of the original image data.

7. The method according to claim 5, wherein said performing a second type of correction includes performing contrast correction for the original image data based on a result of analyzing a histogram of the original image data.

8. A non-transitory computer-readable storage medium for storing a program thereon for causing a computer to execute an image processing method, the method comprising:
inputting image data;
performing a first type of correction for original image data, based on a result of analysis of the original image data and producing corrected image data;
storing the corrected image data in a storage;
performing a first type of manual correction for the image data stored in said storing, using a correction parameter in accordance with a user instruction; and
performing a second type of correction for the original image data, based on a result of analysis of the original image data, in a case when a second type of correction instruction based on an image analysis is input, after the first type of manual correction is performed, the second type of correction being different from the first type of correction.

9. The method medium according to claim 8, wherein said performing a first type of correction includes performing white balance adjustment for the original image data based on a result of analyzing a histogram of the original image data.

10. The medium according to claim 8, wherein said performing a second type of correction includes performing contrast correction for the original image data based on a result of analyzing a histogram of the original image data.

\* \* \* \* \*